United States Patent
Tamai et al.

(10) Patent No.: US 7,757,665 B2
(45) Date of Patent: Jul. 20, 2010

(54) FUEL-CUT MANIFOLD ABSOLUTE PRESSURE CONTROL

(75) Inventors: Goro Tamai, West Bloomfield, MI (US); James L. Worthing, Munith, MI (US)

(73) Assignee: GM Global Technology Operations, Inc.

( * ) Notice: Subject to any disclaimer, the term of this patent is extended or adjusted under 35 U.S.C. 154(b) by 532 days.

(21) Appl. No.: 11/890,765

(22) Filed: Aug. 7, 2007

(65) Prior Publication Data

US 2008/0047524 A1 Feb. 28, 2008

Related U.S. Application Data

(60) Provisional application No. 60/840,389, filed on Aug. 25, 2006.

(51) Int. Cl.
*F02M 51/00* (2006.01)
*G06F 19/00* (2006.01)

(52) U.S. Cl. .............. 123/481; 123/493; 701/110; 701/112

(58) Field of Classification Search .............. 123/198 F, 123/332, 481, 493; 701/103, 104, 110, 112
See application file for complete search history.

(56) References Cited

U.S. PATENT DOCUMENTS

| | | | |
|---|---|---|---|
| 6,018,694 A * | 1/2000 | Egami et al. | 701/102 |
| 6,274,943 B1 * | 8/2001 | Hasegawa et al. | 290/40 C |
| 6,823,840 B1 | 11/2004 | Tamai et al. | |
| 7,051,514 B2 * | 5/2006 | Midlam-Mohler | 60/278 |
| 7,136,727 B2 * | 11/2006 | Seo et al. | 701/22 |
| 2004/0144363 A1 * | 7/2004 | Ament | 123/399 |
| 2005/0126173 A1 * | 6/2005 | Anderson | 60/698 |
| 2005/0228553 A1 * | 10/2005 | Tryon | 701/22 |
| 2006/0021326 A1 * | 2/2006 | Midlam-Mohler | 60/278 |
| 2008/0076623 A1 * | 3/2008 | Tabata et al. | 477/5 |

* cited by examiner

*Primary Examiner*—John T Kwon

(57) ABSTRACT

A method of regulating a throttle opening of an engine in a hybrid electric vehicle system includes initiating a fuel-cut off operating mode of the engine, monitoring an engine speed during said fuel cut-off operating mode and regulating the throttle opening based on the engine speed during the fuel-cut off mode to maintain a manifold absolute pressure (MAP) of the engine above a threshold MAP.

15 Claims, 4 Drawing Sheets

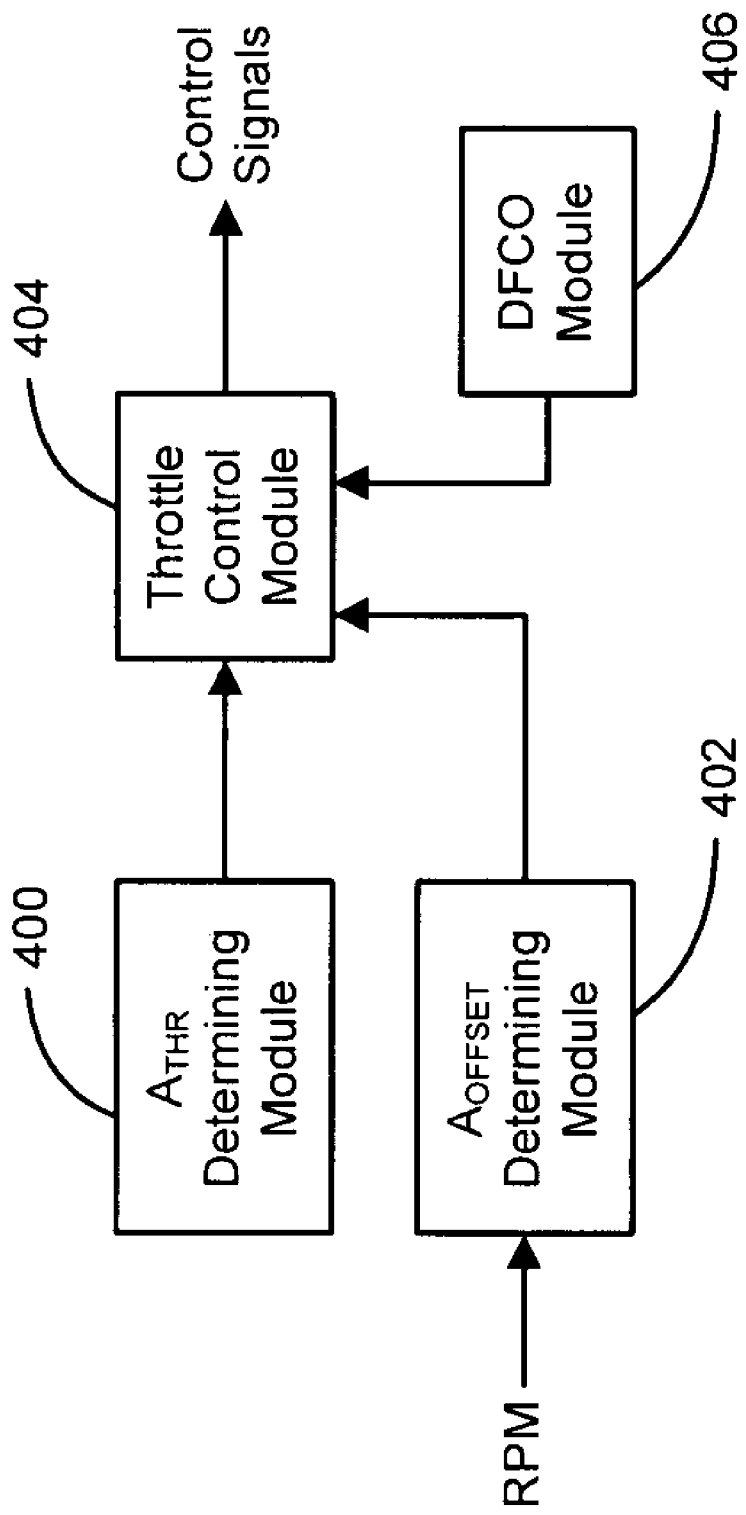

FUEL-CUT MANIFOLD ABSOLUTE PRESSURE CONTROL

CROSS-REFERENCE TO RELATED APPLICATIONS

This application claims the benefit of U.S. Provisional Application No. 60/840,389, filed on Aug. 25, 2006, the disclosure of which is expressly incorporated herein by reference.

FIELD

The present disclosure relates to hybrid vehicles, and more particularly to regulating the engine of a hybrid vehicle in a fuel cut-off mode such as during deceleration fuel cut-off (DFCO) or electric motoring of the engine.

BACKGROUND

Hybrid vehicles are driven by multiple powerplants including, but not limited to an internal combustion engine and an electric machine. The electric machine functions as a motor/generator. In a generator mode, the electric machine is driven by the engine to generate electrical energy used to power electrical loads or charge batteries. In a motor mode, the electric machine supplements the engine, providing drive torque to drive the vehicle drivetrain.

In some instances, the fuel is cut-off to the engine during deceleration (referred to as deceleration fuel cut-off (DFCO)) or electric motoring of the engine. During these events, the engine is back driven, which induces reciprocal movement of the cylinders within the engine. As a result of the back driving of the engine, the manifold absolute pressure (MAP) of an intake manifold of the engine is significantly reduced, resulting in reduced efficiency and other losses. More specifically, reduced MAP results in low pressure in the intake ports and in the combustion chamber (i.e., within the cylinder in the space above the piston).

If the pressure is too low, the oil can be drawn out of the engine crankcase through the piston rings, the valve guides disposed within the inlet ports, as well as through other paths. The piston rings can also flutter or vibrate depending on dynamic pressure differences between the crank case and the combustion chamber, which can be detrimental to the engine and may be perceptible by vehicle occupants.

SUMMARY

Accordingly, the present disclosure provides a method of regulating a throttle opening of an engine in a hybrid electric vehicle system. The method includes initiating a fuel-cut off operating mode of the engine, monitoring an engine speed during the fuel cut-off operating mode and regulating the throttle opening based on the engine speed during the fuel-cut off mode to maintain a manifold absolute pressure (MAP) of the engine above a threshold MAP. By maintaining the MAP above the threshold MAP, the above-described low pressure conditions are avoided. More specifically, the pressure is maintained sufficiently high to inhibit drawing out of the engine oil from the engine crankcase and to prevent flutter or vibration of the piston rings.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a functional block diagram of exemplary modules that execute the MAP control of the present disclosure.

DETAILED DESCRIPTION

Figure 1:
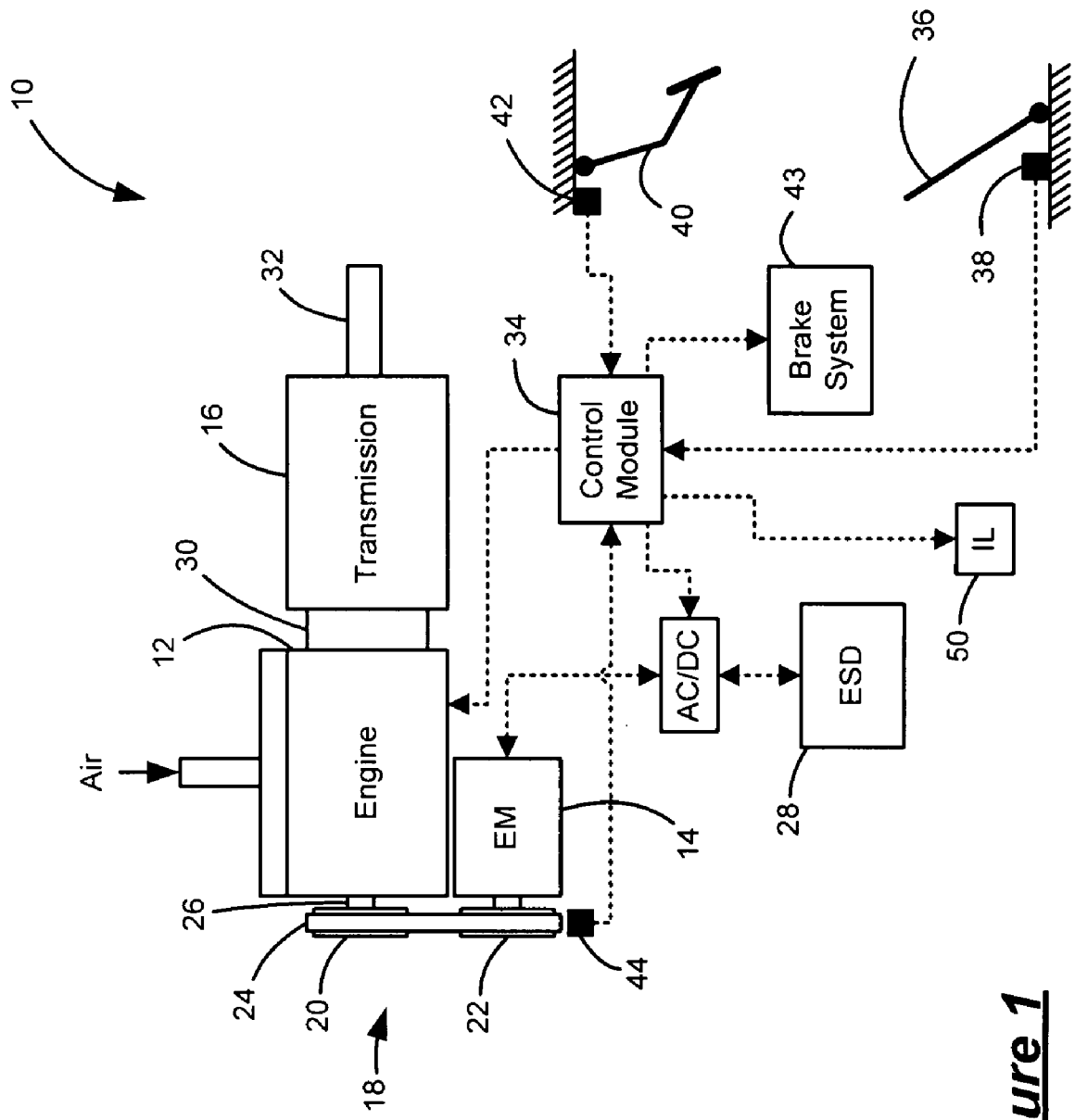
FIG. 1 is a schematic illustration of an exemplary hybrid vehicle system.

The following description of the preferred embodiment is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

As used herein, a fuel cut-off operating (FCO) mode refers to operation during which fuel is cut off to the engine such as during deceleration fuel cut-off (DFCO), electric motoring of the engine or other FCO modes.

Referring now to FIG. 1, an exemplary hybrid vehicle 10 includes an engine 12 and an electric machine 14, which drive a transmission 16. More specifically, the electric machine 14 supplements the engine 12 to produce drive torque to drive the transmission 16. In this manner, fuel efficiency is increased and emissions are reduced. The engine 12 and electric machine 14 are coupled via a belt-alternator-starter (BAS) system 18. More specifically, the electric machine 14 operates as a starter (i.e., motor) and an alternator (i.e., generator) and is coupled to the engine 12 through a belt and pulley system. The engine 12 and the electric machine 14 include pulleys 20, 22, respectively, that are coupled for rotation by a belt 24. The pulley 20 is coupled for rotation with a crankshaft 26 of the engine 12.

In one mode, the engine 12 drives the electric machine 14 to generate power used to recharge an energy storage device (ESD) 28. In another mode, the electric machine 14 drives the engine 12 using energy from the ESD 28. The ESD 28 can include, but is not limited to, a battery or a super-capacitor. Alternatively, the BAS system 18 can be replaced with a flywheel-alternator-starter (FAS) system (not shown), which includes an electric machine operably disposed between the engine and the transmission or a chain or gear system that is implemented between the electric machine 14 and the crankshaft 26.

The transmission 16 can include, but is not limited to, a manual transmission, an automatic transmission, a continuously variable transmission (CVT) and an automated manual transmission (AMT). Drive torque is transferred from the engine crankshaft 26 to the transmission 16 through a coupling device 30. The coupling device 30 can include, but is not limited to, a friction clutch or a torque converter depending upon the type of transmission implemented. The transmission 16 multiplies the drive torque through one of a plurality of gear ratios to drive a driveshaft 32.

A control module 34 regulates operation of the vehicle 10. The control module 34 controls fuel injection and spark to selectively activate and deactivate cylinders of the engine 12. More specifically, when the vehicle 10 is at rest, none of the cylinders of the engine 12 are firing (i.e., are deactivated) and the engine 12 is stopped. During vehicle launch (i.e., acceleration from rest), the electric machine 14 drives the crankshaft to spin-up the engine 12 to an idle RPM and to initiate vehicle acceleration. During periods where low drive torque is needed to drive the vehicle (i.e., a hybrid engine off (HEOff) mode), drive torque is provided by the electric machine 14. When in the HEOff mode, fuel and spark are cut-off to the cylinders of the engine. Further, opening and closing cycles of the intake and exhaust valves can be prevented to inhibit air flow processing within the cylinders.

An accelerator pedal 36 is provided. A pedal position sensor 36 is sensitive to a position of the accelerator pedal 36 and generates a pedal position signal based thereon. A brake pedal 40 is provided. A brake pedal position sensor 42 is sensitive to a position of the brake pedal 40 and generates a pedal position signal based thereon. The control module 34 operates a brake system 43 based on the brake pedal position signal to adjust a pressure within the brake system, which in turn regulates a braking force of brakes (not shown). A speed sensor 44 is responsive to the rotational speed ($RPM_{EM}$) of the electric machine 44. The speed sensor 44 generates a speed signal. The control module 34 operates the vehicle 10 based on the pedal position signals generated by the pedal position sensors 38, 42 and the speed signal generated by the speed sensor 44, as described in further detail below. The engine speed ($RPM_{ENG}$) can be determined based on the speed signal. More specifically, $RPM_{EM}$ can be multiplied by the known pulley ratio to provide $RPM_{ENG}$.

The manifold absolute pressure (MAP) control of the present disclosure regulates the position of the throttle while the engine is being operated in a fuel cut-off (FCO) mode. More specifically, during deceleration fuel and spark are cut-off, preferably on a cylinder by cylinder basis, and the electric machine 14 regeneratively brakes the vehicle to charge the ESD 28. The MAP control of the present disclosure monitors $RPM_{ENG}$ and adjusts the throttle position to maintain the MAP above a threshold level. Fuel cut-off may also occur during electric motoring of the engine.

Figure 2:
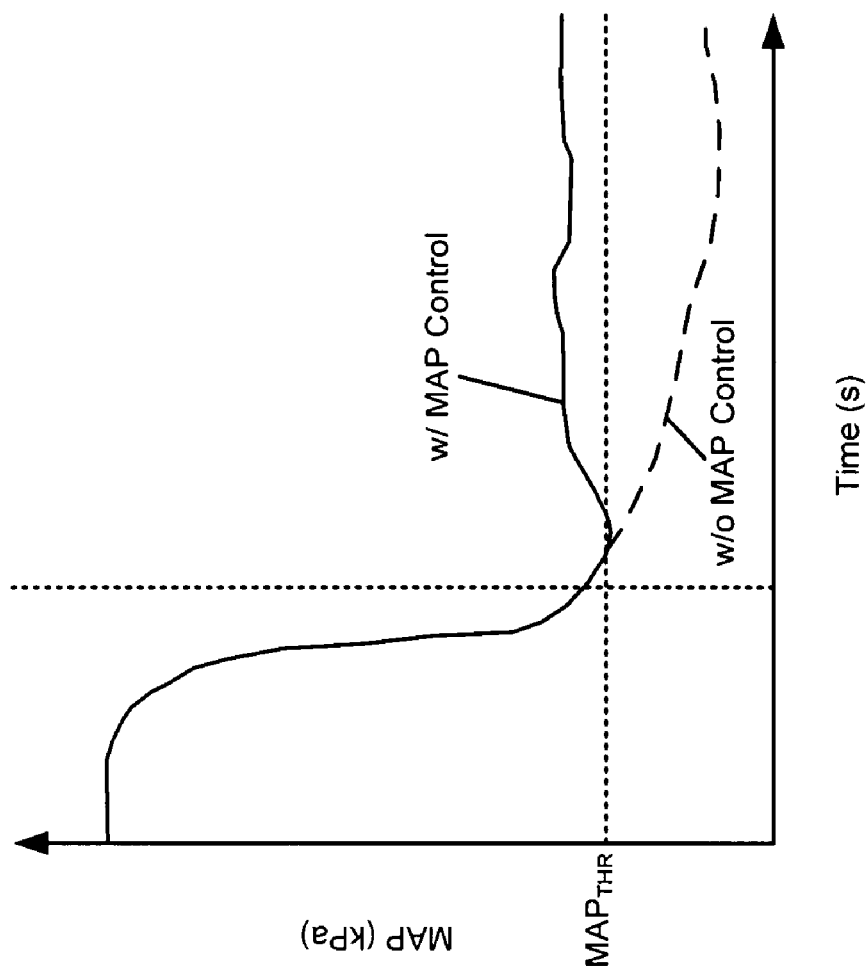
FIG. 2 is a graph illustrating exemplary manifold absolute pressure (MAP) traces based on the MAP control of the present disclosure.

With particular reference to FIG. 2, if the engine is operating in the FCO mode, MAP is monitored and is maintained above a threshold MAP ($MAP_{THR}$). More specifically, the MAP control regulates the throttle area ($A_{THR}$) based on engine RPM. A target or minimum MAP value is determined from a look-up table based on engine RPM. $A_{THR}$ is determined from the minimum MAP value. More specifically, the MAP value is processed through a MAP-based torque model to calculate a desired torque ($T_{DES}$). In a toque-based system, $T_{DES}$ can be used for engine control, wherein the torque model accounts for fuel cut scenarios. For airflow-based systems, a desired air per cylinder (APC) is determined based on the MAP value by solving for APC using an inverse APC torque model. By dividing the desired APC by an intake period, a minimum mass air flow (MAF) needed to satisfy the desired MAP is determined. $A_{THR}$ is then determined based on the minimum MAF.

Figure 3:
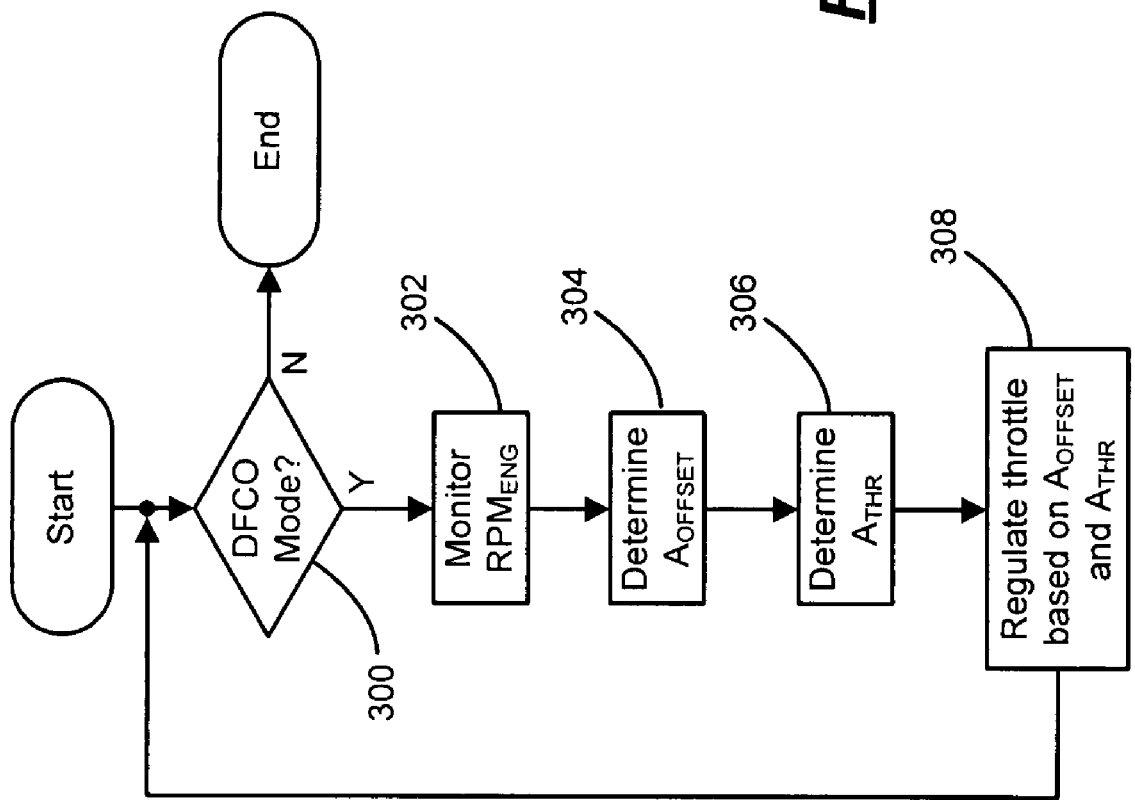
FIG. 3 is a flowchart illustrating exemplary steps executed by the MAP control of the present disclosure.

Referring now to FIG. 3, exemplary steps executed by the MAP control will be described in detail. In step 300, control determines whether the engine is being operated in the FCO mode. If the engine is not being operated in the FCO mode, control ends. If the engine is operating in the FCO mode, control monitors $RPM_{ENG}$ in step 302. In step 304, control determines $A_{THR}$ based on $RPM_{ENG}$. Control regulates the throttle based on $A_{THR}$ in step 308 and loops back to step 300.

Referring now to FIG. 4, exemplary modules that execute the MAP control will be described in detail. The exemplary modules include an $A_{THR}$ determining module 400, an $A_{OFFSET}$ determining module 402, a throttle control module 404 and a FCO module 406. The $A_{THR}$ determining module 400 determines $A_{THR}$ and outputs an $A_{THR}$ value to the throttle control module 404. Similarly, the $A_{OFFSET}$ determining module 400 determines $A_{OFFSET}$ based on $RPM_{ENG}$ and outputs an $A_{OFFSET}$ value to the throttle control module 404.

The FCO module 406 determines whether the engine is operating in the FCO mode and outputs an appropriate signal to the throttle control module 404. The throttle control module 404 regulates the throttle position based on $A_{THR}$ and $A_{OFFSET}$. More specifically, if the engine is operating in the FCO mode, the throttle control module 404 generates throttle control signals based on $A_{THR}$ and $A_{OFFSET}$. If the engine is not operating in the FCO mode, the throttle control module 404 generates throttle control signals based on $A_{THR}$.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of regulating a throttle opening of an engine in a hybrid electric vehicle system, comprising:

initiating a fuel-cut off operating mode of the engine;

monitoring an engine speed;

regulating the throttle opening based on said engine speed during said fuel-cut off mode; and maintaining a manifold absolute pressure (MAP) of said engine above a threshold MAP during said fuel-cut off mode.

2. The method of claim 1 further comprising:

determining a throttle area offset based on said engine speed; and determining a base throttle area, wherein said regulating of said throttle opening is achieved based on said throttle area offset and said base throttle area.

3. The method of claim 2 wherein said throttle area offset is determined from a look-up table.

4. The method of claim 1 further comprising:

determining a minimum MAP based on said engine speed; and determining a base throttle area based on said minimum MAP.

5. The method of claim 1 further comprising:

determining a minimum MAP based on said engine speed; and determining a desired torque based on said minimum MAP.

6. A throttle regulation system of an engine in a hybrid electric vehicle system, comprising:

a first module that initiates a fuel-cut off operating mode of the engine;

a second module that monitors an engine speed;

a third module that regulates a throttle opening based on said engine speed during said fuel-cut off mode, wherein said third module maintains a manifold absolute pressure (MAP) of said engine above a threshold MAP during said fuel-cut off mode.

7. The throttle regulation system of claim 6 further comprising:
a fourth module that determines a throttle area offset based on said engine speed, wherein said fourth module determines a base throttle area, and wherein regulating of said throttle opening is achieved based on said throttle area offset and said base throttle area.

8. The throttle regulation system of claim 7 wherein said throttle area offset is determined from a look-up table.

9. The throttle regulation system of claim 6 further comprising:
a fourth module that determines a minimum MAP based on said engine speed and that determines a base throttle area based on said minimum MAP.

10. The throttle regulation system of claim 9 further comprising:
a fourth module that determines a minimum MAP based on said engine speed and that determines a desired torque based on said minimum MAP.

11. A method of regulating a throttle of an engine in a hybrid electric vehicle system, comprising:
initiating a fuel-cut off operating mode of the engine;
determining one of a desired torque and a base throttle area;
regulating a throttle opening based on said one of said desired torque and said base throttle area during said fuel-cut off mode; and
maintaining a manifold absolute pressure (MAP) of said engine above a threshold MAP during said fuel-cut off mode.

12. The method of claim 11 further comprising:
determining a throttle area offset based on said engine speed; and
determining said base throttle area, wherein said regulating of said throttle opening is achieved based on said throttle area offset and said base throttle area.

13. The method of claim 12 wherein said throttle area offset is determined from a look-up table.

14. The method of claim 11 further comprising:
determining a minimum MAP based on an engine speed; and
determining said base throttle area based on said minimum MAP.

15. The method of claim 11 further comprising:
determining a minimum MAP based on an engine speed; and
determining said desired torque based on said minimum MAP.

* * * * *